(12) United States Patent
Diederich, Jr. et al.

(10) Patent No.: US 7,644,566 B2
(45) Date of Patent: Jan. 12, 2010

(54) CURTAIN TO DIRECT CROP IN A HEADER

(75) Inventors: Anthony F. Diederich, Jr., Terre Hill, PA (US); Edward A. Blakeslee, Ephrata, PA (US); Wayne D. Thaxton, Denver, PA (US)

(73) Assignee: CNH America LLC, New Holland, PA (US)

( * ) Notice: Subject to any disclaimer, the term of this patent is extended or adjusted under 35 U.S.C. 154(b) by 6 days.

(21) Appl. No.: 12/062,644

(22) Filed: Apr. 4, 2008

(65) Prior Publication Data

US 2009/0249763 A1  Oct. 8, 2009

(51) Int. Cl.
*A01D 34/00* (2006.01)
*A01D 43/00* (2006.01)

(52) U.S. Cl. .............................. 56/17.3; 56/17.4; 56/190
(58) Field of Classification Search .................. 56/17.3, 56/17.4, 119, 190, 314, 319, 320, 320.1, 56/399, 1, 192
See application file for complete search history.

(56) References Cited

U.S. PATENT DOCUMENTS

| | | | |
|---|---|---|---|
| 2,311,865 A | 2/1943 | Pilcher | |
| 3,027,701 A * | 4/1962 | Campbell | 56/157 |
| 3,105,264 A * | 10/1963 | Truhon | 16/66 |
| 3,474,602 A | 10/1969 | Molzahn | |
| 3,543,491 A | 12/1970 | Lausch | |
| 3,699,755 A * | 10/1972 | Hauser | 56/16.4 R |
| 3,835,629 A * | 9/1974 | Rosendahl et al. | 56/14.4 |
| 3,866,400 A | 2/1975 | May | |
| 4,388,961 A * | 6/1983 | Schaefer et al. | 160/332 |
| 4,499,711 A * | 2/1985 | McLean | 56/13.6 |
| 4,545,188 A * | 10/1985 | Klinner | 56/364 |
| 4,592,194 A * | 6/1986 | Amstutz | 56/16.4 R |
| 4,722,172 A | 2/1988 | Pearce | |
| 4,903,468 A | 2/1990 | Haberkorn | |
| 5,148,658 A | 9/1992 | Gerger et al. | |
| 5,279,100 A * | 1/1994 | Pruitt et al. | 56/1 |
| 5,447,021 A * | 9/1995 | Plamper et al. | 56/17.4 |
| 5,462,487 A | 10/1995 | Farley et al. | |
| 6,070,401 A | 6/2000 | Johnson | |
| 6,073,431 A * | 6/2000 | Osborne et al. | 56/15.7 |
| 6,568,163 B1 * | 5/2003 | Franet | 56/14.3 |
| 6,901,730 B1 | 6/2005 | Buresch et al. | |
| 2007/0204588 A1 * | 9/2007 | Neece | 56/119 |

FOREIGN PATENT DOCUMENTS

EP 436248 A1 * 7/1991

* cited by examiner

*Primary Examiner*—Thomas B Will
*Assistant Examiner*—Joan D Misa
(74) *Attorney, Agent, or Firm*—Patrick M. Sheldrake; John William Stader; Michael G. Harms

(57) ABSTRACT

A curtain for directing severed crop movement in a cutting header in an agricultural harvester. The curtain optimizes crop movement between a cutterbar to a crop conveying auger for lateral movement of the crop material from outboard ends of the cutting header toward an interior discharge zone for formation of a windrow. The curtain also reduces the tendency for clogging that occurs when crop approaches conveying augers on both sides of an axial centerline by directing all crop material toward the trailing side of the rotating auger and by preventing airflow generated by the auger from disrupting crop approaching the auger. Crop smoothing by the curtain also reduces disturbances to the crop material during movement within the header which reduces seed loss in seed-bearing specialty crops.

20 Claims, 3 Drawing Sheets

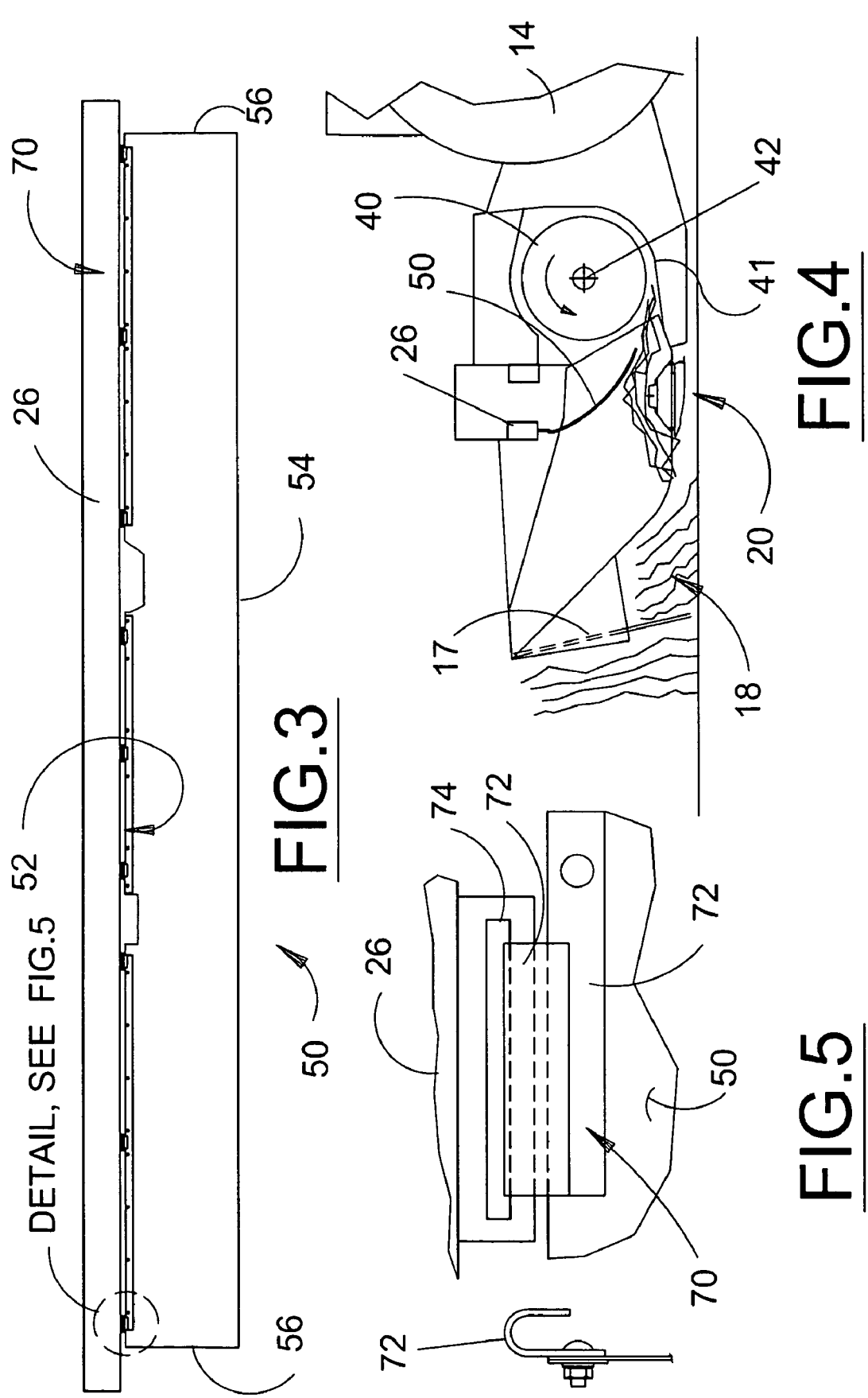

CURTAIN TO DIRECT CROP IN A HEADER

BACKGROUND OF THE INVENTION

This invention relates generally to a machine for harvesting crops in a field and forming a windrow of cut crop, more particularly, to a curtain for managing crop flow coming off of the cutterbar and directing it into the header for subsequent crop processing.

In modern crop harvesting machines, it is desirable to optimize cutting headers for specific crops in order to maximize harvesting efficiency. Such optimized headers are typically based on existing header designs with specific-purpose modifications incorporated to alter finite portions of the crop flow within the header to suit the specific crop being harvested. This approach helps control production costs of the equipment and extends the life cycle of a basic header design.

One specific application involves harvesting of grasses, seed or other specialty crops having seeds on a stem which must be cut and dried in a windrow a desired amount before undertaking operations to separate the seed from the stems. Care must be taken when working with such crops to minimize disturbances to the cut crop material which results is dislodgement and loss of the seeds, especially when a rotary disc cutterbar is used. A cutting header must be capable of cutting the crop from the ground and forming a windrow to allow crop drying in advance of subsequent harvesting operations without dislodging significant amount of seed from the stem. Conditioning mechanisms are typically omitted in the harvest of such specialty crops. Other headers might include a conditioning mechanism but require alterations to the crop movement apparatus ahead of the conditioning mechanism to optimize crop movement for maximum harvesting efficiency. Experience has shown that other changes to crop conveying and handling devices in the header are also desirable to prevent crop clogging and entanglement with moving mechanisms in the header. Clogs result in lost harvesting productivity while an operator removes the entangled crop and also lost seed due to the increased disruption to the crop material when the entanglement begins.

It is known to use a windrower having a header equipped with a transversely arranged crop conveying apparatus, such as an auger featuring opposite-hand flighting on each end for conveying severed crop material within the header. U.S. Pat. No. 5,327,709 granted to Webb on Jul. 12, 1994 shows a typical crop severing header using such a transverse feed mechanism of this type. Efficient crop movement within the header requires that the severed crop material be properly aligned and optimally positioned as it approaches the conveyor apparatus to prevent crop from wrapping around the moving mechanism. While a forward debris skirt is known for managing crop movement into the header and toward the cutterbar apparatus, crop movement between the cutterbar apparatus and the transverse conveyance/consolidation apparatus remains problematic. Additionally, air flow generated by the conveyor or apparatus or conditioning rolls, if present, tends to move in a forward direction counter to the rearwardly moving cut crop, which can disrupt crop flow within the header. When specialty crops which require gentler handling to avoid loss of seed are involved, the importance of efficiently managing crop flow from the cutterbar to the windrow becomes even more important.

It would be desirable to provide an apparatus for smoothing and managing seed-bearing crop flow into a specialty crop header which reduces the loss of seed from the crop while efficiently conveying severed crop material toward a centrally located discharge zone for formation of a windrow that overcomes the above problems and limitations. Still more desirable would be an apparatus that improves crop material movement with a variety of crop harvesting headers.

SUMMARY OF THE INVENTION

Accordingly, it is an object of the present invention to provide a specialty crop harvesting header which efficiently gathers severed crop from a cutterbar and conveys it to a discharge zone and there deposits the crop evenly to form a uniform windrow.

It is a further object of the present invention to provide a crop harvesting header having an additional transversely arranged curtain for directing severed crop material into a transverse crop converging apparatus without undue disturbance of specialty crops which could damage the crop.

It is a further object of the present invention to provide a transverse curtain to smooth severed crop material and direct it into an transverse crop conveyance mechanism for optimal movement toward a central discharge zone in a header.

It is a further object of the present invention to provide a flexible curtain disposed rearwardly from a forwardly positioned skirt wherein the curtain has a lower edge located just above the cutterbar for optimally orienting severed crop material for feed into a transversely arranged crop conveyance mechanism for conveyance toward a central discharge zone and formation of a windrow.

It is a still further object of the present invention to provide a flexible curtain for directing severed crop material into a transverse converging auger mechanism that improves resistance to clogging or entanglement of the severed crop material with the auger.

It is a still further object of the present invention to provide a curtain for directing severed crop material into a transversely arranged auger mechanism that is easily connected or removed from the header.

It is a still further object of the present invention to provide a curtain for directing severed crop material into a transversely arranged auger mechanism that is easily removable from the header yet is not easily dislodged during normal operation of the header.

It is yet another object of the present invention to provide a curtain for optimizing severed crop material movement into a transverse crop conveying apparatus wherein the curtain is easily adaptable for use on a standard header design thereby enabling efficient manufacturing of a variety of crop harvesting headers.

It is yet another object of the present invention to provide a curtain for a header which limits the interaction of airflow generated within the header or an aft-mounted conditioning mechanism with the severed crop material entering the header thereby improving cut crop movement through the header.

It is a still further object of the present invention to provide a curtain which reduces the buildup of foreign material, such as mud, within the header during harvesting operations.

It is a still further object of the present invention to provide a curtain for optimizing crop movement into a transversely arranged crop conveyance mechanism that is durable in construction, inexpensive of manufacture, carefree of maintenance, easily assembled, and simple and effective to use.

These and other objects are achieved according to the instant invention by providing a curtain for directing severed crop movement in a cutting header in an agricultural harvester. The curtain optimizes crop movement between a cutterbar and a transverse crop conveying apparatus which urges crop material from the outboard ends of the cutting header toward an interior discharge zone for discharge from the header and formation of a windrow. The curtain also reduces the tendency for clogging in the conveying apparatus that occurs when crop approaches the apparatus with a higher than optimal approach path. Furthermore, the curtain limits the interaction of airflow, whether generated by a transverse conveying apparatus or by a conditioner apparatus, from disrupting cut crop as it enters the header. Crop smoothing by the curtain reduces disturbances to the crop material during movement within the header which reduces seed loss in seed-bearing specialty crops and enhances non-specialty crop movement through the header.

BRIEF DESCRIPTION OF THE DRAWINGS

The advantages of this invention will be apparent upon consideration of the following detailed disclosure of the invention, especially when taken in conjunction with the accompanying drawings wherein:

FIG. 3 is an elevation view showing connection of the crop directing curtain to the upper panel support structure on the header;

FIG. 4 is a side sectional view of a header showing the relationship of the crop directing curtain to the transverse auger and FIG. 5 is a detail view of a single hook and receptacle structure for connecting the crop directing to the upper panel support structure.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Figure 1:
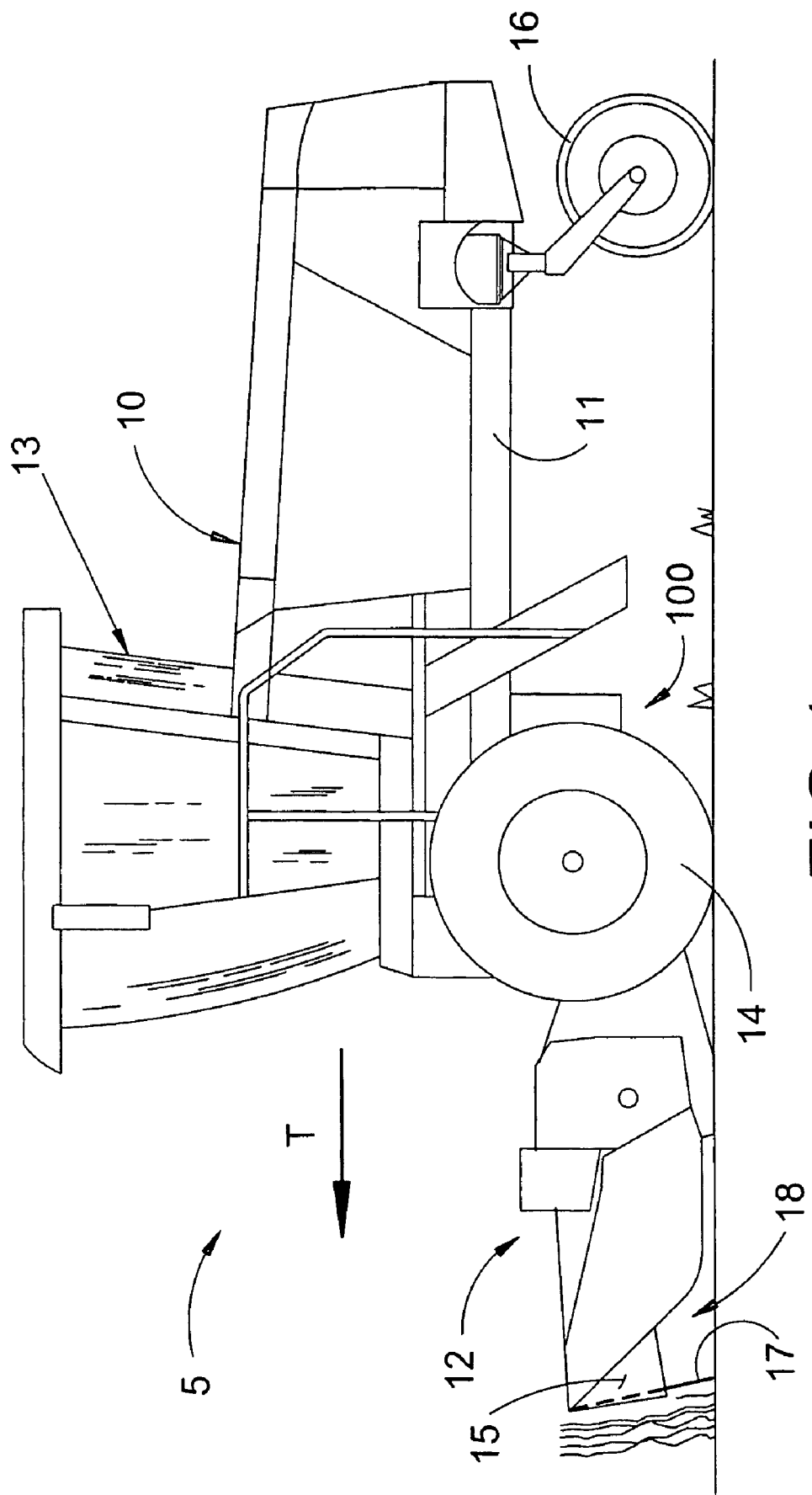
FIG. 1 is a side elevation view of a typical agricultural windrower suitable for fitment with a specialty cutting header of the type on which the present invention is useful.

FIG. 1 shows a side view of a typical self-propelled windrower 5 used for harvesting a standing crop as it travels forwardly across the ground in the direction indicated by arrow "T." Usually, a tractor 10 pushes a header 12 which severs the crop material from the ground by a sickle-bar, rotary cutter or other functionally equivalent cutting means arranged along the forward edge of the header 12. The tractor 10 has a chassis 11 for supporting various components of the windrower 5, including a set of transversely spaced-apart drive wheels 14 for propelling the windrower across the ground and at least one, and typically a pair of rear wheels 16 in the form of castors which allow the windrower to turn. There is an operator cab 13 where the operator controls the windrower operation. The crop is cut by a cutting means (not shown) in the leading edge of the header and falls rearwardly into the header. The crop material enters the header by first passing under a forward skirt 17 which is supported by extensions 15 of the header side walls and then into a crop intake area 18. Forward skirt 17 arranges the crop for cutting and prevents debris caught up in the cutting means from being forwardly ejected from the header. Forward skirt 17 may be in the form of a continuous sheet of flexible or semi-rigid material, multiple sheets arranged to span the width of the intake area 18, or a series of suspended chains arranged to form a curtain-like protective barrier. Once cut, the crop material is urged toward the center of the header by motion of the cutterbar, by contours of the header, by a transversely arranged crop conveyance means, or any combination thereof. The crop is then ejected rearwardly from the header 12, generally in the space between the drive wheels 14, through a centrally positioned crop discharge zone whereupon it may be directed to a conditioning apparatus and/or ejected to fall to the ground in a windrow. Shields (not shown) are used to arrange the windrow into a desired uniform configuration generally trailing along the longitudinal axis of the windrower.

While the preferred embodiment of the present invention includes a transversely oriented crop conveying apparatus positioned rearwardly from the cutterbar and a centrally-positioned crop discharge zone for ejecting severed crop directly onto the ground, the invention is also beneficial for headers lacking a transverse conveyor and for headers used in conjunction with a conditioning apparatus. Accordingly, use of the presented invention with a variety of header configurations in contemplated within the scope of this invention.

The general operation and construction of windrowers of the type on which the present invention may find utility can be found in U.S. Pat. No. 5,327,709, issued on Jul. 12, 1994, to Webb, U.S. Pat. No. 6,073,431, issued on Jun. 13, 2000, to Osborne et al., and U.S. Pat. No. 6,662,539, issued on Dec. 16, 2003 to Adams et al., the descriptive portions of which are incorporated herein by reference.

Figure 2:
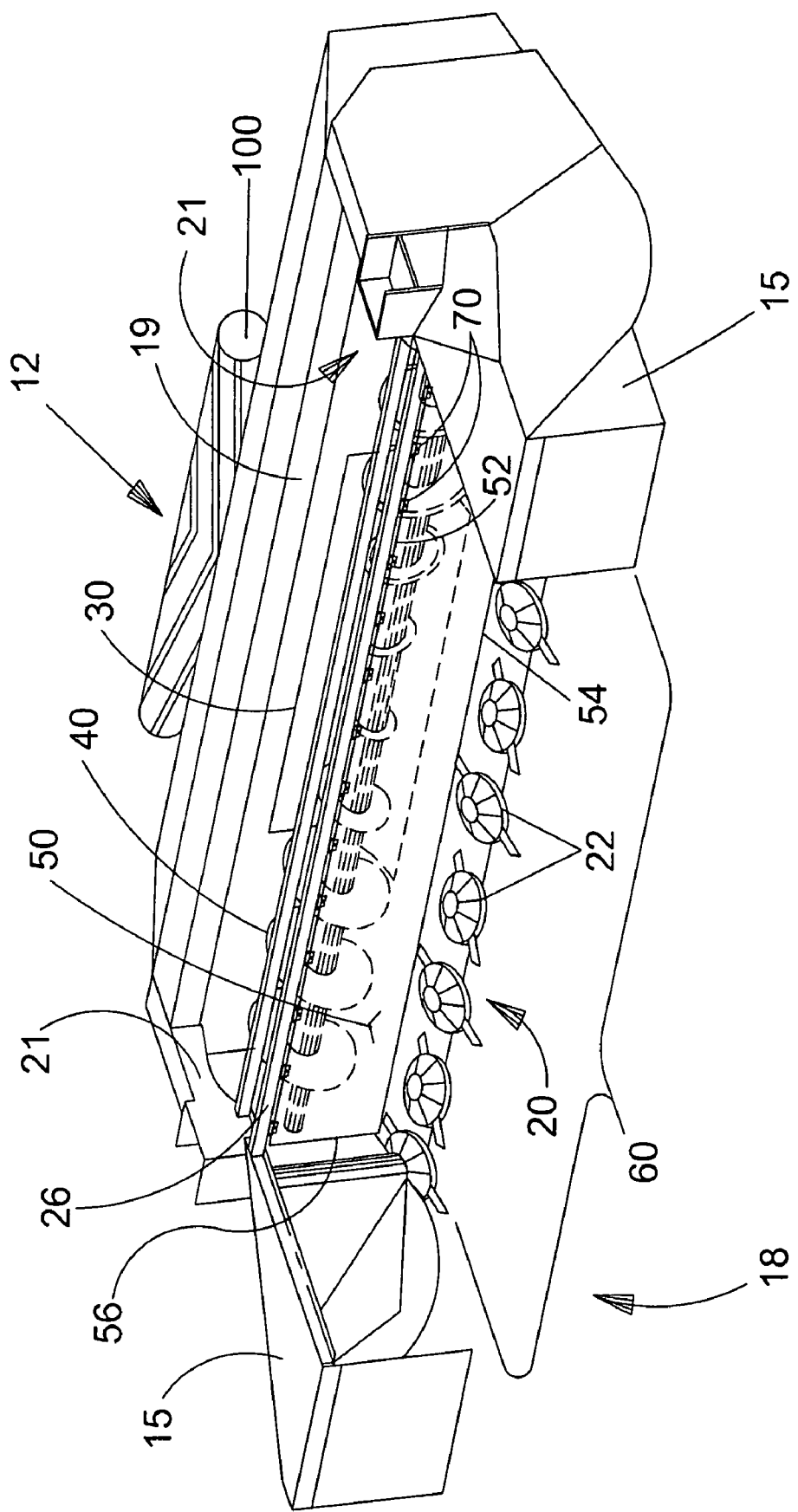
FIG. 2 is a partial perspective view of a specialty cutting header incorporating a first embodiment of the present invention.

Now referring to FIG. 2, wherein a cutting header 12 is presented having generally opposing side walls 21 generally defining the header width connected by a transverse frame 19. Cutterbar 20 extends across the lower forward edge of the header 12 for substantially the entire width of the header to sever standing crop and form a consolidated windrow. Cutterbar 20 is powered by the prime mover by well-known means, with the final power delivery means generally being a rotating shaft located at one end of the cutter bar. Wider cutterbars may feature drive shafts at each end of the cutterbar. While a rotary-type cutterbar is shown in FIG. 2 having a plurality of rotary cutters 22, one skilled in the art will recognize that other type of crop severing apparatus would be equally functional for harvesting a standing crop. The present invention may also provide utility when used with such alternate cutterbars.

A crop discharge opening 30 is provided in the rearward portion of the header allowing severed crop material to be discharged rearwardly from the header 12 to form a windrow. As is common in modern cutting headers, the width of the cutterbar 20 is substantially greater than the width of the discharge opening 30 as the discharge opening width must be limited for proper windrow formation. As the severed crop material moves rearwardly into the header, a transverse crop conveyor 40 may be provided to interact with the crop material and the surrounding structure of the header, typically a trough-like structure (41, shown in FIG. 4), and urge the crop material toward the much narrower discharge opening 30. Such active conveyors improve crop movement within the header. Some header designs, however, do not feature active conveyor mechanisms and instead rely on the design of the interior surfaces of the header to manage crop movement through the header. The present invention provides utility in these alternate designs as well.

Header 12 generally includes one or more top panels covering the portion of the header between the crop intake area 18 and the cutterbar 20. These panels have been removed from FIG. 2 for clarity; however, the rearward portion of the panels is supported by a panel support structure 26 which is connected to and extends between the side walls 21. Panel support structure 26 also provides an attachment structure for crop directing curtain 50 which is suspended from the support structure 26 so that, under static non-operating conditions, it hangs downward to a position just above the cutterbar.

Referring now to FIGS. 2 and 3, crop directing curtain 50 features a surface bounded by an upper edge 52, a lower edge 54, and a pair of generally opposing side edges 56 which, when installed in header 12, are disposed generally adjacent to side walls 21 so that curtain 50 extends generally across the transverse width of the cutterbar 20 and the cutter header opening 60. The lower edge 54 of curtain 50 is positioned a small distance above the cutterbar 20, preferably on the order of one to two inches, such that a minimal gap exists between the cutterbar and the lower edge 54. By maintaining this gap relatively small, airflow generated by the crop conveyor 40 and/or by conditioner rolls, if included, is prevented from impinging upon crop material as it is directed from the cutterbar 20 into the header which reduces the disruption on the crop as it is fed into the header. In headers lacking a transverse crop conveyor but having rearwardly disposed conditioner rolls, use of curtain 50 enhances cut crop movement by preventing air flow generated by the conditioner rolls from interacting with the crop. Blocking this reverse air flow is more critical for efficient crop movement in headers lacking active crop converging devices.

As best shown in FIGS. 3 and 5, curtain 50 is connected to support structure 26 by a plurality of curtain supports 70, each comprising a plurality of hook structures 72 engaged into receptacles 74. The shape and orientation of hook structures 72 is designed to preclude accidental disengagement of the curtain support during machine operation while allowing easy intentional removal of the curtain 50 for maintenance or access to the cutterbar or header internals.

Finally, referring to FIG. 4, operation of header 12 with crop directing curtain 50 is illustrated. In a first embodiment, header 12 is propelled across a field of standing crop. The crop first encounters forward skirt 17 as the intake area 18 moves over the crop. Forward skirt 17 bends the crop to align it for severing by cutterbar 20. Standing crop spans the entire width of the header at this position. As the crop is severed from the ground by cutterbar 20, it continues rearward movement, relative to the header, toward transverse crop conveyor 40, which is a rotating auger in the preferred embodiment. The direction of auger rotation is indicated by an arrow in FIG. 4. In order to prevent severed crop material from moving upward and engaging the auger at a point above its rotational centerline 42 where the crop material is likely to clog or jam in the auger, the surface of curtain 50 directs the severed crop toward the lower forward portion of the auger so that the severed crop will be easily feed into the auger. The surface of curtain 50 also acts as a barrier against crop movement to a position above the rotational centerline of the auger where it would tend to cause clogs and jams in the crop movement within the header. Streamlining the crop flow into the transverse conveying mechanism (auger) 40 reduces the disruption of the crop, which when specialty, seed-bearing crop are involved, reduces the amount of seed loss during the windrowing operation.

In a second embodiment, transverse crop conveyor 40 may or may not be present, but a conditioner apparatus 100 is positioned (see FIGS. 1 and 2) rearwardly from the header discharge opening 30. Operation of conditioners is well known and not discussed further in detail. Roll-type conditioners generate substantial air flow directed toward the front of the header in a direction that is opposite to that of the crop material being fed rearwardly toward the conditioner apparatus 100. The placement of curtain 50 in this embodiment limits the interaction of the forward flow of air with the cut crop material thereby allowing the cut crop material to continue its rearward movement more efficiently.

Curtain 50 is preferably formed from a flexible material such as reinforced rubber fabric to enable the curtain to conform to the contours of the passing crop material. Curtain 50 preferably comprises a single panel; however, those skilled in the art will recognize that identical functional result may also be achieved using a curtain made up of multiple smaller panels as long the combined curtain spans the width of the header. It is preferred that the surface of curtain 50 be generally non-porous to prevent airflow generated within the header or conditioner from impinging on the severed crop material moving into the header. Use of materials having greater stiffness or better resistance to wear is also contemplated for curtain 50. Stiffer materials, such as sheet metal, deform less across their height resulting in more pivotal movement at the curtain supports 70.

Additionally, use of a non-porous material for the curtain 50 enables the curtain to deflect incoming debris and reduce the accumulation of such debris in the header. During muddy conditions, mud build-up can add significant weight to the header and cause header position control problem for the tractor. Testing has shown that mud entering the header having been kicked up by the cutterbar temporarily adheres to the upper portion of curtain 50. When the header is raised and lowered, as would be typical at the end of a swath, the vertical motion tends to dislodge the mud accumulated on the curtain allowing it to drop to the ground rather than being trapped in the header.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. An apparatus for directing crop movement in a windrowing header for an agricultural crop harvester, the header having a forward facing crop intake for receiving a standing crop, the intake being bounded by generally opposing side walls and an upper panel spanning therebetween, a forward skirt connected to said upper panel and positioned in said forward facing crop intake, a cutter opening being disposed rearwardly from the crop intake, the cutter opening being bounded by the side walls, an upper panel support structure, and a bottom edge spanning between the side walls to define a cutter width, a cutterbar disposed along the bottom edge for severing a standing crop from the ground, and a rearward discharge for depositing cut crop material on the ground in a windrow, the rearward discharge having a width substantially less than the header width, the apparatus comprising:

a flexible curtain connected to the upper panel support structure and extending downwardly into the cutter opening, the flexible curtain having a surface area defined by an upper edge, a lower edge, and a pair of generally opposing side edges, said side edges being positioned adjacent to the side walls, each side edge having a length defining a curtain length, said lower edge being positioned adjacent to and directly above the cutterbar when no crop is being engaged by the cutterbar and whereby said flexible curtain deflects rearwardly when said flexible curtain interacts with the crop material as the header is moved through the standing crop to direct severed crop material to the rearward discharge.

2. The apparatus of claim 1, further comprising a transversely arranged converging apparatus for conveying cut crop material from the cutter width to the discharge opening, the converging apparatus having an outer diameter and a centerline axis positioned rearwardly from the cutterbar, said curtain interacting with the crop material as the header is moved through the standing crop to direct severed crop material to a location below said centerline axis of said converging apparatus.

3. The apparatus of claim 2, wherein said curtain length is sufficient to extend rearwardly from a position above the center line axis to a position adjacent the outer diameter of the converging apparatus and below the centerline axis when said curtain is pivoted rearwardly.

4. The apparatus of claim 1, further comprising a plurality of hook structures connected to said curtain upper edge and a plurality of receptacles positioned on the top cover for receiving said hook structures wherein the interface between said plurality of hook structures and said plurality of receptacles allows said curtain to pivot without disengaging said plurality of hook structures from said plurality of receptacles.

5. The apparatus of claim 4, wherein said side edges are positioned generally adjacent to the side walls so that said curtain generally spans the cutter width.

6. The apparatus of claim 5, wherein said curtain is made from a non-porous material which blocks air flow therethrough.

7. The apparatus of claim 5, wherein said curtain is a single panel.

8. The apparatus of claim 5, wherein said curtain comprises multiple panels.

9. In a crop harvesting machine having a ground supported chassis for forward movement of a cutting header across the ground, the header having a forward facing crop intake for receiving a standing crop, the intake being bounded by generally opposing side walls and an upper panel spanning therebetween, a forward skirt connected to said upper panel and positioned in said forward facing crop intake, a cutter opening being disposed rearwardly from the crop intake, the cutter opening being bounded by the side walls, an upper panel support structure, and a bottom edge spanning between the side walls to define a cutter width, a cutterbar disposed along the bottom edge for severing a standing crop from the ground, and a rearward discharge for depositing cut crop material on the ground in a windrow, the rearward discharge having a width substantially less than the header width, the improvement comprising:

a flexible curtain connected to the upper panel support structure and extending downwardly into the cutter opening, the flexible curtain having a surface area defined by an upper edge, a lower edge, and a pair of generally opposing side edges, each side edge having a length defining a flexible curtain length, said lower edge being positioned adjacent to and directly above the cutterbar when no crop is being engaged by the cutterbar and whereby said flexible curtain deflects rearwardly when said flexible curtain interacts with the crop material as the header is moved through the standing crop to direct severed crop material to a location below the centerline axis of a converging apparatus.

10. The improvement of claim 9, wherein the converging apparatus is a transversely arranged converging apparatus for conveying cut crop material from the cutter width to the discharge opening, the converging apparatus having the outer diameter and the centerline axis positioned rearwardly from the cutterbar, said curtain interacting with the crop material as the header is moved through the standing crop to direct severed crop material to a location below said centerline axis of said converging apparatus.

11. The improvement of claim 10, wherein said curtain length is sufficient to extend from a position above the centerline axis rearwardly to a position adjacent the outer diameter of the converging apparatus and below the centerline axis when said curtain is pivoted rearwardly.

12. The improvement of claim 9, further comprising a plurality of hook structures connected to said curtain upper edge and a plurality of receptacles positioned on the top cover for receiving said hook structures wherein the interface between said plurality of hook structures and said plurality of receptacles allows said curtain to pivot without disengaging said plurality of hook structures from said plurality of receptacles.

13. The improvement of claim 11, wherein said side edges are positioned generally adjacent to the side walls so that said curtain generally spans the cutter width.

14. The improvement of claim 11, wherein said curtain is made from a non-porous material which blocks air flow therethrough.

15. The improvement of claim 11, wherein said curtain is a single panel.

16. The improvement of claim 11, wherein said curtain comprises multiple panels.

17. A method of redirecting a crop damaging airflow in a crop harvesting header comprising the steps:

providing a header having a forward facing crop intake for receiving a standing crop and a rearward facing discharge for returning severed crop to the ground in the form of a windrow, the intake being substantially wider than the discharge;

providing a cutterbar disposed along a front edge of the intake for severing a standing crop from the ground;

providing a flexible curtain connected to the header and extending downwardly into the crop intake, the flexible curtain having a surface area bounded by an upper edge, a lower edge, and a pair of generally opposing side edges, each side edge having a length defining a curtain length, the lower edge being positioned adjacent to and directly above the cutterbar when no crop is being engaged by the cutterbar;

powering the header to operate the cutterbar;

propelling the header through a standing crop so that the flexible curtain interacts with the crop material and is deflected rearwardly to direct severed crop material to the rearward facing discharge preventing airflow caused during operation of the header from interacting with the severed crop material as it moves into the header.

18. The method of claim 17, wherein the curtain is made from a non-porous material which blocks air flow therethrough.

19. The method of claim 18, wherein the curtain is a single panel.

20. The method of claim 17, wherein the air flow is caused by conditioning apparatus mounted rearwardly from the rearward facing discharge.

* * * * *